United States Patent [19]

Jost et al.

[11] Patent Number: 5,061,186

[45] Date of Patent: Oct. 29, 1991

[54] VOICE-TRAINING APPARATUS

[76] Inventors: Peter Jost, Nusswaldgasse 22a/IV, 1190 Vienna; Erwin Klösch, Zirkusgasse 52/2, 1020 Vienna, both of Austria

[21] Appl. No.: 442,342

[22] PCT Filed: Feb. 15, 1989

[86] PCT No.: PCT/AT89/00013

§ 371 Date: Oct. 25, 1989

§ 102(e) Date: Oct. 25, 1989

[87] PCT Pub. No.: WO89/07818

PCT Pub. Date: Aug. 24, 1989

[30] Foreign Application Priority Data

Feb. 17, 1988 [AT] Austria ................... 374/88

[51] Int. Cl.$^5$ ............................................. G09B 19/04
[52] U.S. Cl. .................................. 434/185; 434/169; 434/319; 272/93; 73/379; 128/782; 340/573; 367/198
[58] Field of Search ............... 434/168, 185, 308, 309, 434/318–320, 429, 430, 169; 272/93, DIG. 4, DIG. 5; 73/379; 128/720, 721, 773, 782; 340/573, 574, 626, 668; 367/198, 199

[56] References Cited

U.S. PATENT DOCUMENTS

| | | | |
|---|---|---|---|
| 4,519,399 | 5/1985 | Hori ................................. | 434/185 X |
| 4,641,343 | 2/1987 | Holland et al. ................. | 434/185 X |
| 4,895,162 | 1/1990 | Dolliver ........................... | 128/721 |

FOREIGN PATENT DOCUMENTS

| | | | |
|---|---|---|---|
| 2038267 | 2/1972 | Fed. Rep. of Germany . | |
| 2841308 | 4/1980 | Fed. Rep. of Germany ...... | 434/185 |

OTHER PUBLICATIONS

"Advanced Data Acquisition Aids the Handicapped", by Davis et al., Computer Design, Jun. 1983, pp. 121–131.

Primary Examiner—Richard J. Apley
Assistant Examiner—Joe H. Cheng
Attorney, Agent, or Firm—Herbert Dubno

[57] ABSTRACT

In an apparatus for voice training, on several points of a student's body measuring devices are provided, which are connected to optical display devices. At each of these measuring devices, a pressure sensor amplifier is connected with an analog multiplexer, and a sound-pressure measuring device is directly connected to the respective display device.

8 Claims, 2 Drawing Sheets

VOICE-TRAINING APPARATUS

FIELD OF THE INVENTION

The invention relates to an apparatus for voice-training with several measuring devices provided at several points on a student's body, namely on the flanks and thorax for measuring the dimensional changes and on the skull and connected to optical display devices.

THE RELATED ART

Apparatuse for monitoring, particularly for self-training in speech- and singing techniques are already known, since adult speakers or singers are very often not in the position to naturally coordinate their sound emission, i.e. each sound delivery, such as speaking, singing, and the like with breathing techniques, without the benefit of training, such as is the case in animals or particularly in small children. With the known apparatuses, points on the body of a speaker or singer are connected to optical display devices via measuring devices, and the display takes place through lighting on determined points of a board. However, it has been found that the heretofore-known apparatuses could stand improvement, and that primarily a new distribution of the measuring points on the body could be appropriate.

SUMMARY OF THE INVENTION

Now, according to the invention, it is proposed that a pressure sensor amplifier for the head resonance, a pressure sensor amplifier for the pressure at the root of the tongue, a pressure sensor amplifier for the thorax pressure and a pressure sensor amplifier for the flank pressure be directly connected to the corresponding display device, via an analog multiplexer and a sound-pressure measuring device, whereby the measuring device for the sound pressure is provided with a squelch circuit depending on the thorax- and flank pressure.

The present invention renders it possible not only to perform self-training, but also to offer to speech- and singing teachers the possibility to demonstrate to the student his own mistakes and to give instructions for their elimination. Due to the detection and recordal of the measured values at different points of the body, it is possible to constantly show the mistakes to the student, and it is also possible to identify improvements by superposition or through comparative displays.

BRIEF DESCRIPTION OF THE INVENTION

The present invention as well as its varied features, objectives and advantages are described with the aid of the examples shown in the drawing wherein:

FIG. 5 represents a sectional view of a face illustrating nostril adapter and tongue root sensor.

DETAILED DISCUSSION

Figure 1:
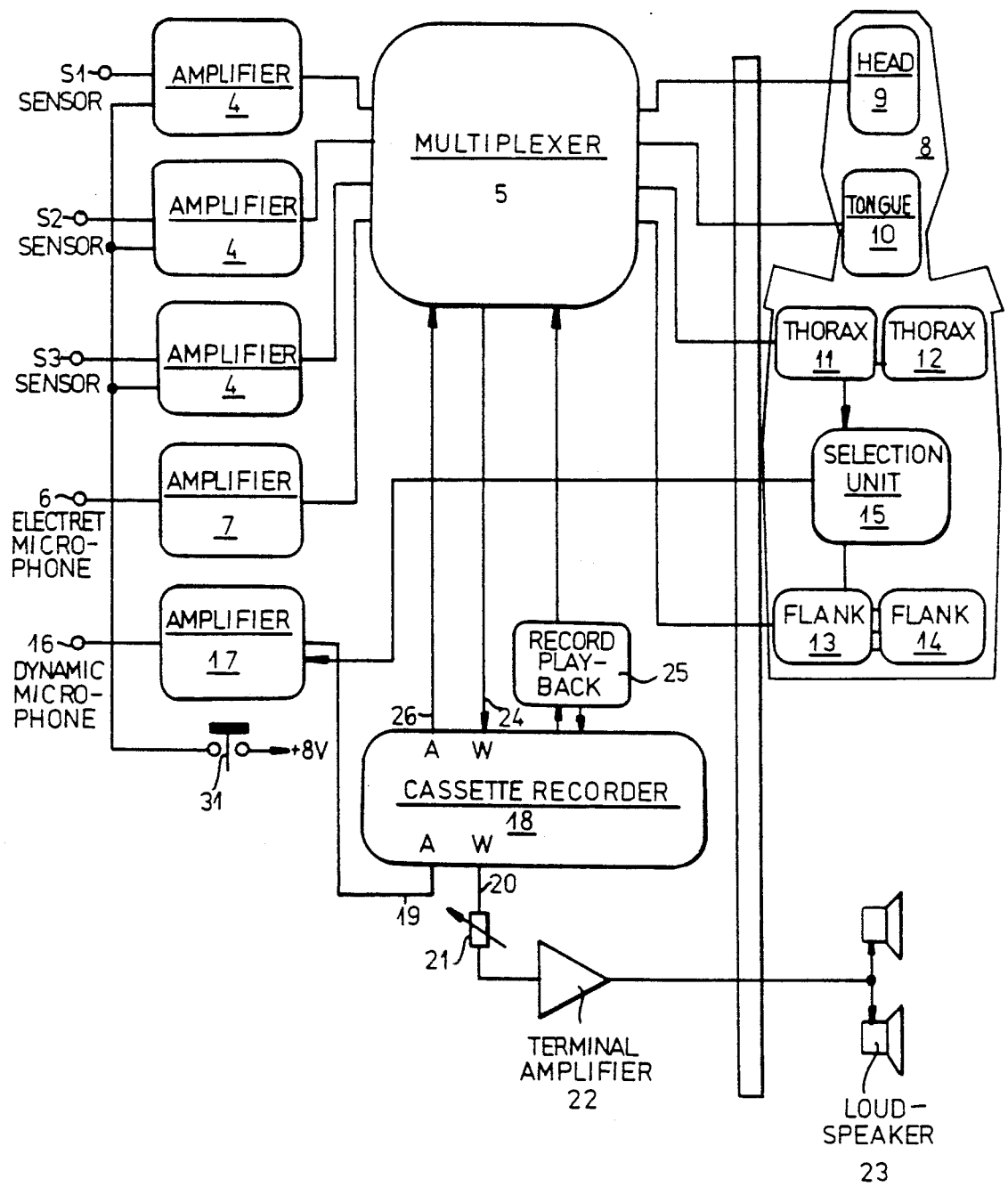
FIG. 1 shows a basic circuit diagram of the apparatus of the invention, including the display device.

FIG. 1, the arrangement of the invention is schematically illustrated. On the body of the student are affixed a pressure sensor S1 for measuring the tongue root pressure, a pressure sensor S2 for measuring the thorax pressure and a pressure sensor S3 for measuring the flank pressure each being connected over a pressure sensor amplifier 4 to the inputs of an analog-multiplexer system 5. The detection of the head resonance takes place over the electret microphone 6 and a nostril adapter 40 with closed air column, which is also connected to one input of the multiplexer system 5, via its own pressure sensor amplifier 7. Now a display board 8 is arranged, whereon display devices are provided. These display devices are associated with the individual measuring devices and are located on corresponding points of the display board 8. This way, there is one light bar 9 for the head resonance, one light bar 10 for the pressure at the tongue root 42, a divided light bar 11, 12 for the thorax pressure, a further divided light bar 13, 14 for the flank pressure and furthermore a selection unit 15. In order to measure the sound pressure, i.e. the voice, a dynamic microphone 16 is provided which is connected via a microphone amplifier 17 to a recording device, preferably a cassette recorder 18. The light bars 11 and 13 are connected to the selection unit 15, which is a muting control in the form of a squelch circuit. This muting control is connected to one input of the microphone amplifier. The cassette recorder 18 has one pick-up input 19, to which the microphone amplifier 17 is connected, and a play-back output 20, which is connected to one or several loudspeakers 23, via a volume-control 21 and a terminal amplifier 22.

Further, the multiplex system is connected to a pick-up input 24 and a record/play-back selection 25, which acts upon the drive mechanism of the cassette recorder 18. A play-back outlet 26 is connected to the multiplex system 5.

The signals received from the elements S1, S2, S3 and 6 are converted into a common impulse signal in the multiplexer system 5, and are stored on a track via the input 21 of the cassette recorder 18. On a second track of the cassette recorder 18, the signal of the microphone amplifier is recorded. The four input signals coming from the elements S1, S2, S3 and 6 are successively converted in the multiplexer into value-corresponding intervals, and these are stored as alternating-current pulse sets on the magnet carrier since the cassette recorder can not directly transmit direct-current values. When the recording is played back, the process takes place in the reverse order, and in order to differentiate the channels, a synchronous beat is also inserted. It has to be expressly pointed out that there are no fixed beat times, but, depending on signal value, all four signals are continuously transmitted with maximal speed (full recording) and the amplitude and the stability of the recording is fully compensated.

Figure 2:
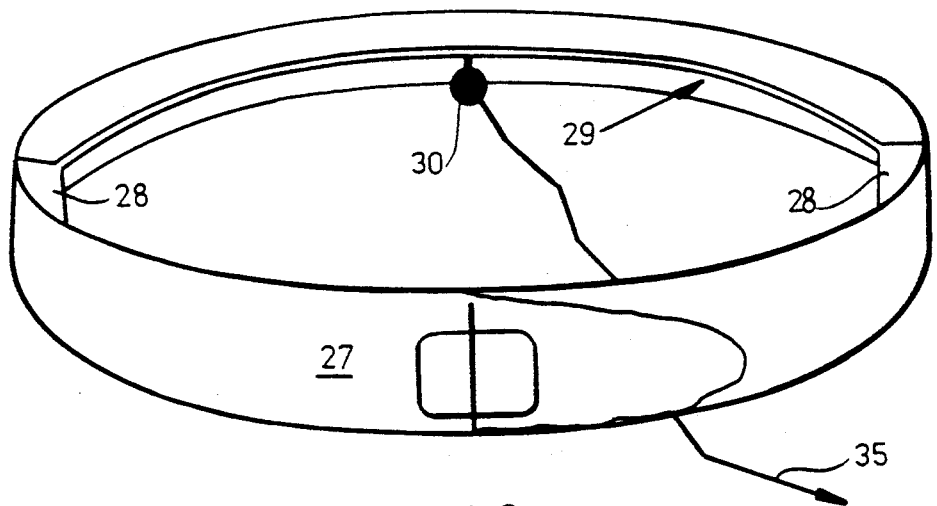
FIG. 2 shows a belt for measuring the thorax- or flank pressure.

In FIG. 2 is shown an embodiment of the pressure-sensor belt 27. This pressure-sensor belt has one or two pressure pads 28, which via the pressure line 29 leads to the actual pressure sensor 30, from where a signal is directed via a conductor 35 to the pressure sensor amplifier 4. Such a belt can be used for measuring the thorax pressure, as well as the flank pressure. Thereby, only one pressure pad is sufficient, although in FIG. 2, two such pads are shown. The head resonance is established by means of a simple pressure pad and a pressure transmitter, which are known per se and are not represented in the drawing. The pressure sensor amplifier 4 and 7 each have an automatic basic-pressure adjuster, which is schematically shown in FIG. 1 at 31.

Figure 3:
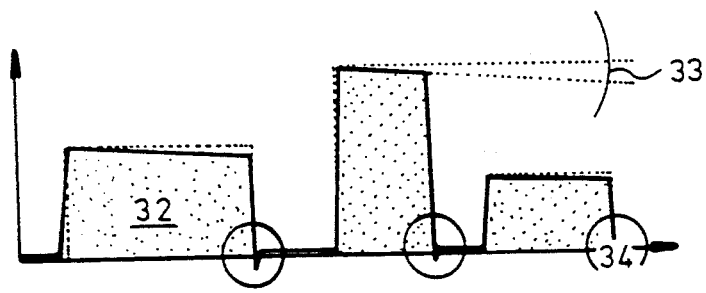
FIG. 3 shows the sensor signals, wherein an automatic basic-pressure compensation has taken place.

From FIG. 3 it can be seen that the sensor signal 32 is statically lead towards minus so slowly, that dynamically there is no essential measuring influence. The drop of the measuring signal is marked 33. However, if the "zero level" (pause) drops below zero, such as shown at 34, a quick correction takes place, whereby the general pressure of the belt is always hovering about zero.

Figure 4:
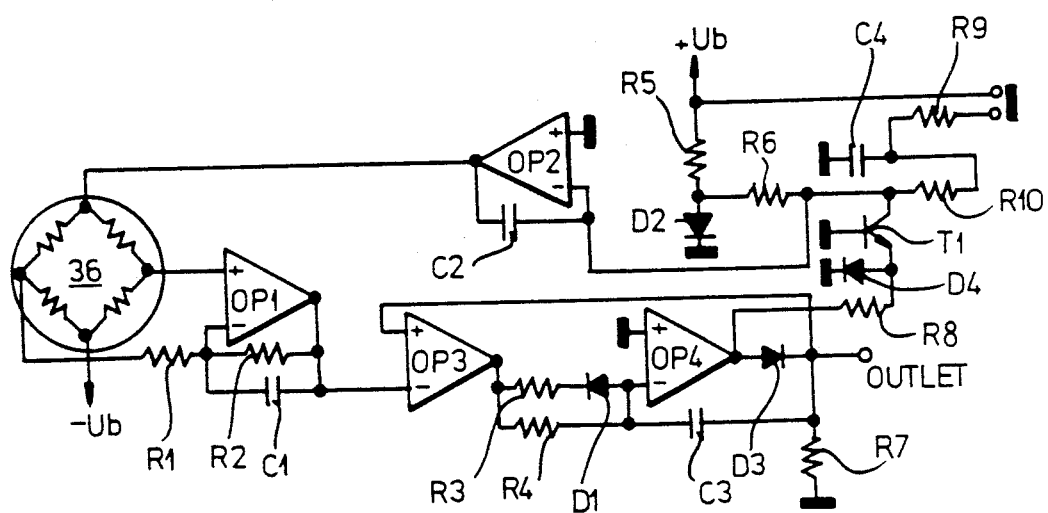
FIG. 4 represents a pressure sensor amplifier.

A possibility of a pressure sensor amplifier with automatic zero adjustment and peak value storage is shown in FIG. 4. Pressure sensors 36 on the basis of strain-resistant gauges have a drawback: they produce a relatively low exit signal, but need, in relation to that, high operating voltages; furthermore, the bridge-resistance values are defined by the manufacturer only at approximately ±50%. Therefore, an accurate zero adjustment (offset) is absolutely required; also, in the special application case, the base pressure is variable, and since only a relative measurement is required, has to be compensated.

A further problem results from the subsequent multiplex storage, which extracts only very short momentary values from the signal and, for this reason, does not deliver a representative result in the case of quick signal fluctuations.

MODE OF OPERATION

The operation amplifier OP1 is the actual amplifier, its amplification results from: R1+ internal bridge resistance to R2, C1 acts as a 50 Hz-filter (low-pass filter against network stray effects). OP3+4 form a control integrator, i.e. it integrates only to the applied input level. The integration period is different for positive and negative changes of the input due to diode D1, which applies R3 only at positive changes parallel to the integration resistance R4. C3 is the integration condenser, diode D3 with the terminal resistance R7 prevents negative output signals, its forward residual voltage being balanced by the comparator OP3. OP2 delivers the operating voltage for the measuring bridge, being partially an integrator/comparator through C2, partially in connection with the transistor T1 a "sample- and- hold" circuit.

When the arrangement is switched on, the C2 is discharged and the OP2 delivers zero volts, whereby the measuring bridge, and thereby the OP1, go down to zero. However, the OP4 can not integrate minus through the diode D3, and therefore it switches fully to −Ub. As a result, the transistor T1 becomes conductive and controls as a constant current source the OP2, which as integrator/comparator slides so far towards (+), until the pressure sensor is no longer in the (−) range. Now, the OP3/4 can work normally, whereby the T1 is closed (hold function for OP2). D4 is a backlash voltage protection for T1.

Over a diode D2 biased by R5, OP2 receives continuously a positive integration current over the (very high-ohmig) R6, which makes it slide very slowly towards (−), and as a result the circuit oscillates with very reduced amplitude around zero.

If the basic pressure is far towards (+), the correction will last long (burdensome), and therefore a quick-acting adjustment was provided, through R9+10 with a filter condenser C4. The function corresponds to the effect of R6. Since at the junction R6/R10/C1/T1C through the OP2 it has to be zero, several channels can be simultaneously corrected with the same key, without interference. R9+10 have to be selected so that R8 has a lower impedance, this way zero volt can be avoided, since T1 cancels the action of the adjustment key.

If R3 is very low with respect to R4, the "controlled integrator" works as a peak-value receiver with linear discharge flank.

In the apparatus according to the invention, it is possible to directly display and also store the individual values, which are important for self-training and for the training with an instructor, so that also later, at any time, a display can appear on the display board 8. This way, it is possible to immediately establish mistakes of the students, and later to determine progress with the aid of comparisons with better recordings.

We claim:
1. A voice-training apparatus comprising:
   a means for measuring dimensional changes on a flank of a human body, said means including a pressure sensor amplifier for flank pressure;
   a means for measuring dimensional changes on a thorax of said human body, said means including a pressure sensor amplifier for thorax pressure;
   a means for measuring dimensional changes on a head of said human body, said means including a pressure sensor amplifier for head resonance and for pressure at a tongue root;
   each of said means being attached to said respective flank, thorax and head of said human body.
   a respective optical display device for displaying values measured by each of said flank, thorax and head measuring means;
   an analog multiplexer receiving signals from each of said pressure sensor amplifiers and communicating with said respective optical display devices; and
   a squelch circuit selectively muting sound input depending upon pressure levels from said thorax and flank.

2. The apparatus according to claim 1 wherein said pressure sensor amplifier for head resonance includes an electret microphone and a nostril adapter with closed air column for both nostrils.

3. The apparatus according to claim 1 further comprising a storage device means for storing alternating-current pulses, said pulses being formed from said signals from each of said pressure sensor amplifiers received by said multiplexer and conveyed to said storage device means.

4. The apparatus according to claim 3 further comprising a sound-pressure measuring device which is a dynamic microphone and a play-back device, said microphone and play-back device being connected to said multiplexer, and said play-back device is a cassette recorder.

5. The apparatus according to claim 1 further comprising an automatic basic-pressure adjuster for each of said pressure sensor amplifiers, said automatic basic-pressure adjuster functioning to return said signals from each of said pressure sensor amplifiers that fall below a preset zero level back to said zero level, and an analog memory for recording peak values of said signals from each of said pressure sensor amplifiers.

6. The apparatus according to claim 1 wherein said means for measuring dimensional changes on said thorax and said flank are pressure sensors, said sensors being in pad form and connected via a hose to a common pressure sensor, said pads being supported on a belt fitted around said human body, and said thorax and said flank pressure sensor amplifiers being connected to said respective pads.

7. The apparatus according to claim 6 wherein said pressure sensor amplifiers function to provide a quick-acting correction to sensor signals from said pressure sensors as said sensor signals with respective to a time interval slightly drop and fall below a preset zero level, thereby ensuring that said belt has a basic pressure that always hovers around zero.

8. The apparatus according to claim 1 wherein said signals from each of said pressure sensor amplifiers to said analog multiplexer are successively converted in corresponding intervals to alternating-current pulse sets which are stored on a magnetic carrier.

* * * * *